United States Patent

[11] 3,569,699

| | | | | |
|---|---|---|---|---|
| [72] | Inventor | Andrzej Cielecki ul. Polna 54m50., Warsaw, Poland | | |
| [21] | Appl. No. | 737,203 | | |
| [22] | Filed | June 14, 1968 | | |
| [45] | Patented | Mar. 9, 1971 | | |
| [32] | Priority | June 14, 1967 | | |
| [33] | | Poland | | |
| [31] | | P. 121,133 | | |

[54] A DEVICE FOR DETECTING CRYSTALLOGRAPHIC DEFECTS IN SEMICONDUCTOR CRYSTALS
8 Claims, 5 Drawing Figs.

[52] U.S. Cl. .................................................. 250/52, 250/53, 250/83.3
[51] Int. Cl. ..................................................... G01n 21/00
[50] Field of Search .......................................... 250/52, 53, 51.5, 83.3 (IR), 83.3(D)

[56] References Cited
UNITED STATES PATENTS

| | | | | |
|---|---|---|---|---|
| 2,713,125 | 7/1955 | Geisler et al. .................. | 250/51.5 |
| 2,907,883 | 10/1959 | Jacobs et al. .................. | 250/52X |
| 3,434,332 | 3/1969 | Maley ........................... | 250/83.3IR |

Primary Examiner—James W. Lawrence
Assistant Examiner—A. L. Birch
Attorney—Waters, Roditi, Schwartz & Nissen ABSTRACT: A device is provided for detecting crystallographic defects in semiconductor monocrystals and the device comprises a stationary light source, an optical system and a detector, in that order. A sample semiconductor to be tested is movably mounted between the light source and the detector with respect to a stationary light ray produced by the source. The sample is supported on an arm of a vibrator, which in turn is supported on a cam mounted on a rotary shaft. A potentiometer has a slider connected to the rotary shaft and to the vertical plates of a picture tube, whose horizontal plates are connected by means of an amplifier of a time base voltage to the output of a filter which is also used to supply the actuating mechanism of the vibrator via a phase shifter.

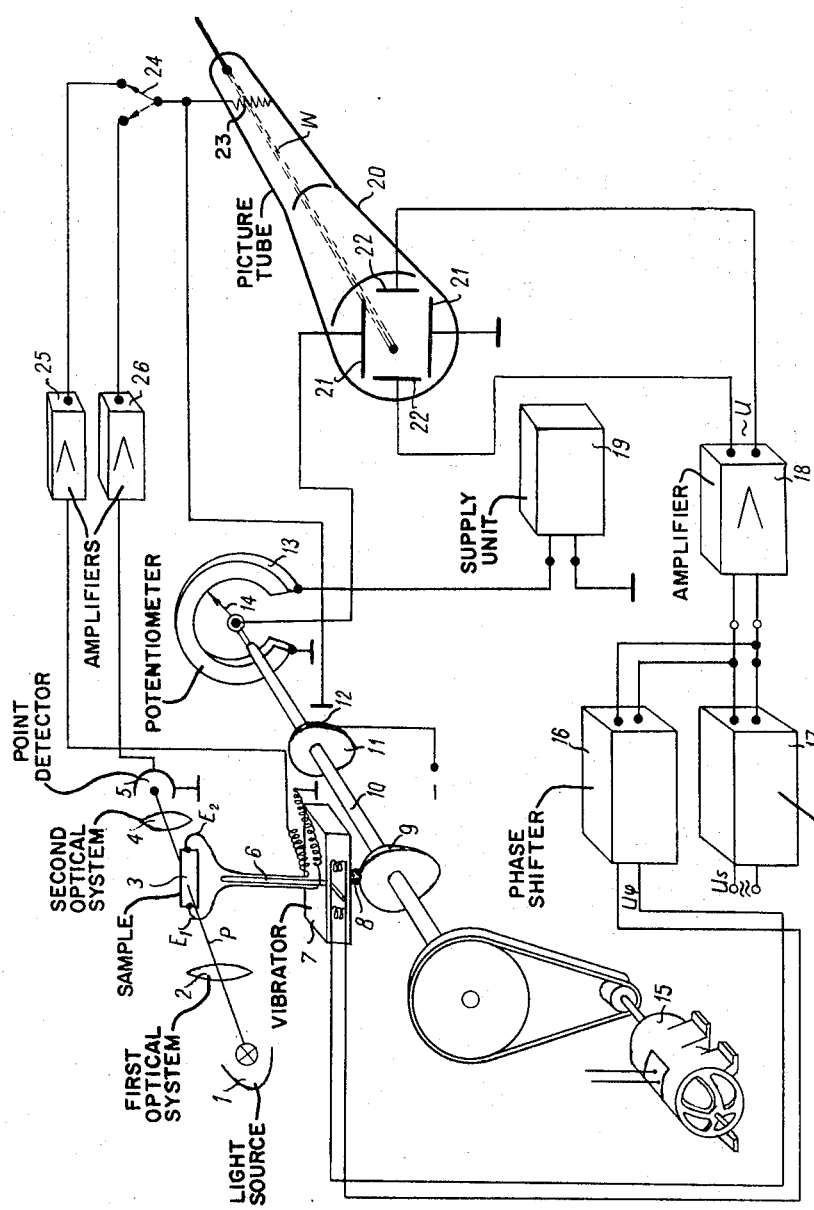

INVENTOR.
ANDRZEJ CIELECKI

INVENTOR.
ANDRZEJ CIELECKI

A DEVICE FOR DETECTING CRYSTALLOGRAPHIC DEFECTS IN SEMICONDUCTOR CRYSTALS

The invention relates to a device for detecting crystallographic defects in materials, especially in semiconductor crystals, making use of a wide range of infrared spectrum. Such defects arise as a result of various impurities and gas evolution in a crystal growing process. Single dislocations, their densities and twinning in crystals can be also reckoned among these defects.

A number of known devices are used, at present, for detecting and localizing these defects.

One of the devices is a microscope with an infrared converter called noctovisor. This is an ordinary microscope in which a tube-image converter is inserted between the lens and eyepiece. This tube by the use of the photoelectric effect, converts an infrared image produced by the lens into an image in visible light. The devices take advantage only of the infrared spectrum range between 0.7 to 1.2 m.

There is also known a device comprising a superorthicon or vidicon tube, the light-sensitive mosaic of which is made sensitive to light wavelengths within the infrared range from 0.7 to 1.4 m. In this device, the infrared image of a crystal is projected through an optical system onto the light-sensitive mosaic of the vidicon tube. The optical image in the tube is then converted, by means of electronic scanning, into an electrical signal which is transmitted to a receiving monitor. This arrangement introduces considerable interferences to the crystal image, these being due to heterogeneous photoelectric sensitivity of the pickup tube.

The mosaic of a pickup tube consists of light-sensitive polycrystalline elements the polycrystallineity of which cause the sensitivity to be different in different points of these elements which become therefore a source of interfering signals. The signals make difficult, to a great extent, the examination of defects in single crystals which feature, as a rule, far lower heterogeneity than that of a pickup tube mosaic.

The above-mentioned devices operate within a spectrum range close to the infrared in view of the sensitivity of photoelements and do not enable the examination of germanium cyrstals.

A great improvement is obtained with shows a device which operates on the optical scanning principle, analogous to electronic scanning, wherein a luminous flux forms a light spot which moves, point by point, over the examined crystal. The light flux, having passed the wafer under test, strikes a detector placed therebehind. The tested wafer is fixed in this device and the light-spot movement is obtained by a moving optical system arranged in front of and behind the wafer. Such moving optical systems are established by rotary or shifting mirrors, lenses and prisms. The light spot can plot any arbitrary curve such as a cycloid, raster curve or a circle. A thermistor or photoresistive detector is used to convert the optical image of the tested wafer into an electrical signal which is fed to a monitor. This device has the disadvantage of the use of a troublesome and low-precision optical system which makes it impracticable to direct the luminous flux, which has passed the tested wafer, onto one point of the detector. This condition is not indispensable in the case of using a thermistor which has a lower but homogeneous sensitivity. When using a polycrystalline detector in the form of lead sulfide having a high but heterogeneous sensitivity, the light spot must be positively projected onto one, and always the same detector point of maximum sensitivity if the best image and true data, relating both the to the intrinsic and surface structure, of the tested wafer are to be obtained. The interference signals will then be very low.

There is also known a device in which a light spot is projected on one selected point of a point-detector, and the optical scanning is obtained by means of an illuminated rotary disc with holes therein. In this device, best use is made of the advantageous properties of a point detector, however, the nonuniformity in the small holes in the disc has a detrimental effect on the results of wafer tests, this nonuniformity and that of the disc surface cannot be avoided in practice. The faults in the holes as well as in the illumination of the disc give rise to a spurious light modulation the magnitude of which is considerably higher than due to the defects in the monocrystal wafer under test.

There is also known, from the U.S. Pat. No. 2,878,395, a photoelectric device wherein an oscillatory motion is applied to the tested wafer with respect to a stationary-light flux and detector.

It is an object of the present invention to provide an improved device which eliminates the faults, particularly of detrimental light modulation, of the devices heretofore known, and it fully utilizes the merits of a point detector, made of lead sulfide or cadmium sulfide. It is also the aim of the invention to provide a simple device to reproduce the image of tested material.

This aim of the invention is achieved by making use of the known motion of a tested monocrystalline semiconductor wafer with respect to an optical system, detector and light flux directed onto the wafer, these latter remaining stationary. The tested wafer is placed on the arm of a vibrator the motion of which is synchronized with the motion of an electron beam in a picture tube. These motions can have, for example, the form of a raster. The vibrator arm is arranged to oscillate in a level plane in accordance with the horizontal motion of the electron beam in the picture tube. The vertical motion of the vibrator is provided by supporting the vibrator on a cam rotating on its shaft. A potentiometer is fitted on this shaft to provide a supply voltage for vertical deflection plates.

The detector signal is fed via an amplifying system to the grid or the cathode of the picture tube. The deflection voltage of the electron beam in the tube is synchronized with the motion of the tested wafer. The voltage applied to the vertical plates is synchronized with the vertical motion of the wafer while the voltage applied to the horizontal plates is synchronized with the horizontal motion of the wafer. In a particular case, the voltage supplying the horizontal plates of the picture tube may have the same sinusoidal waveform as the voltage used to energize the winding of the vibrator which horizontally actuates the tested wafer.

This solution permits the use of a point-detector and adjustment of the light spot so that it will touch only one point of the detector, i.e. the most sensitive point. The effects of nonuniform location of holes on a rotary disc, nonuniform illumination and light-spot oscillations over a detector which unavoidably are the sources of interferences, are thus eliminated. The tested wafer can be moved along a curve having the shape of a circle, cycloid or, most frequently, this motion plots a raster. In general, this is a cyclically repeated motion synchronized with that of the electron beam in a picture tube.

An embodiment of the invention will now be further described by way of example, with reference to the accompanying drawings, wherein:

FIG. 1 is a perspective view diagrammatically showing the device according to the invention;

Figure 4:
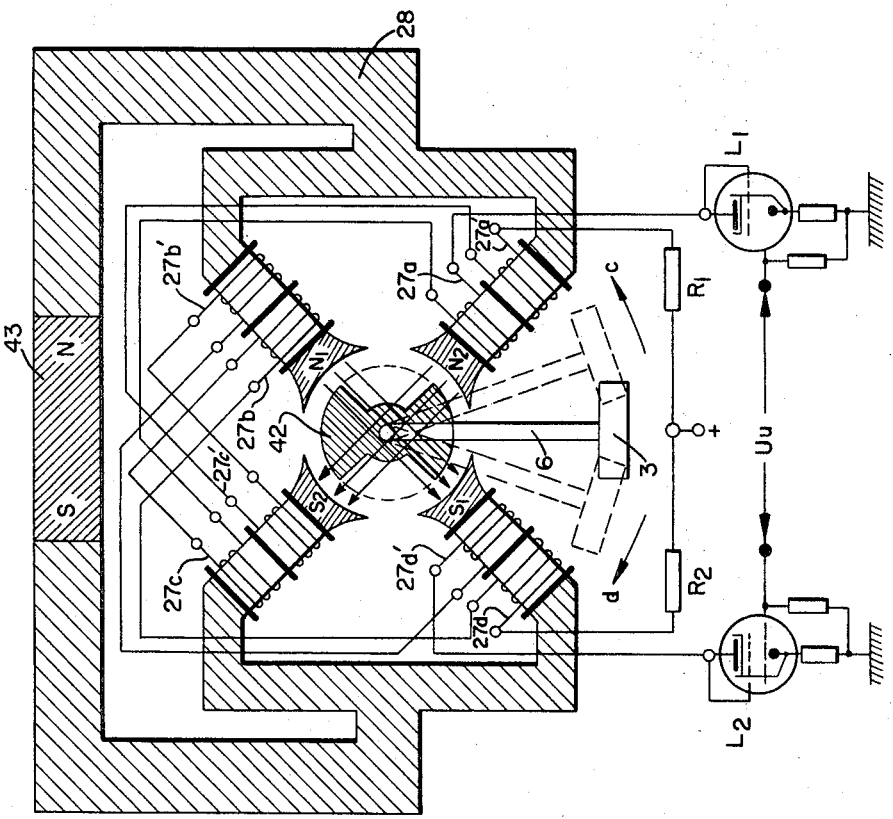
FIG. 4 shows the vibrator with a control stage.

The device according to the invention in FIG. 1, consists of a light source 1 whose beam P passes an optical system 2, a monocrystal sample 3 under test, a second optical system 4, and is projected on a point-detector 5.

The monocrystal sample 3 is secured by means of an electrode $E_1$ and an electrode $E_2$ to an arm 6 of a vibrator 7. The vibrator 7 abuts by means of a bearing 8 against a cam 9 which is mounted on a shaft 10 driven by a motor 15. A cam 11 with contacts 12 and a slider 14 of a potentiometer 13 are also mounted on the shaft 10.

The contacts 12 are used to feed a blanking voltage to a grid 23 of a picture tube 20. The potentiometer 13 supplied from a supply unit 19 provides the source of deflection voltage for vertical plates 21 of the tube 20. A governor 29 (FIG. 3) is mounted on the arm 6 to provide adjustment of the moment of inertia of this arm. The horizontal deflection plates 22 of the tube 20 are connected to an amplifier 18 of a time base voltage which amplifier is supplied with mains voltage US via filter 17. A phase shifter 16 which supplies the winding of the vibrator 7 is also connected to the output of filter 17.

A voltage U supplying the horizontal plates 22 is led by a voltage U supplying the winding of the vibrator 7 because the tested sample 3 together with the vibrating arm 6 has some inertia which results in a phase lag of the tested sample with respect to electron beam W reproducing image on the tube 20 screen. The grid 23 of the tube 20 is controlled, via switch 24 contact $a$ and amplifier 26, by absorption signal from the point-detector 5. The grid 23 is also controlled, via switch 24 contact $b$ and amplifier 25, by the photoeffect signal developed across the electrodes $E_1$ and $E_2$.

Figure 2:
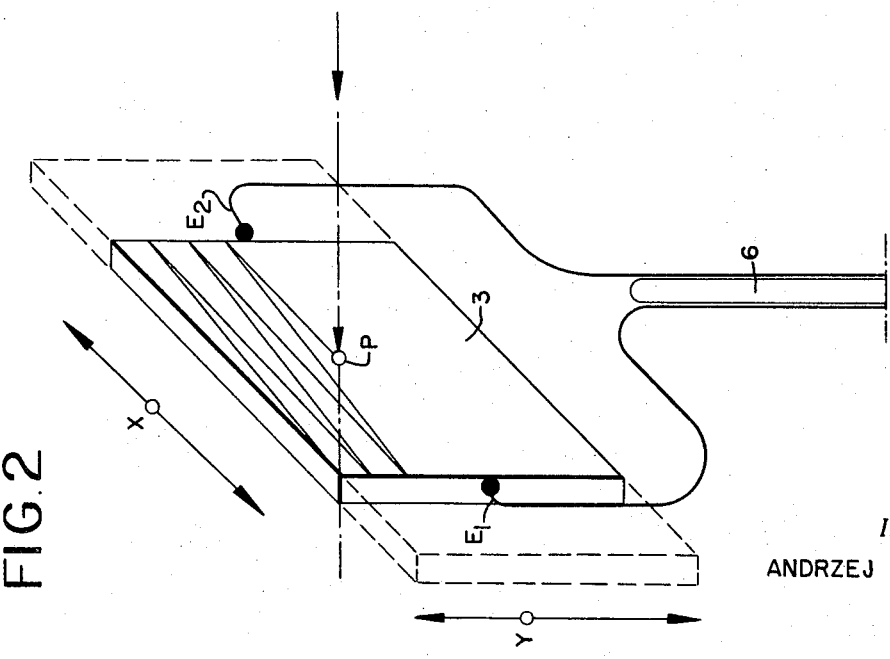
FIG. 2 shows one example of a motion of a monocrystalline wafer.

FIG. 2 shows the horizontal movement of the sample 3 together with the two electrodes $E_1$ and $E_2$ and the arm 6 with respect to the light ray P. The horizontal movement of the sample is indicated by arrow X while the vertical movement by arrow Y.

Figure 3A:
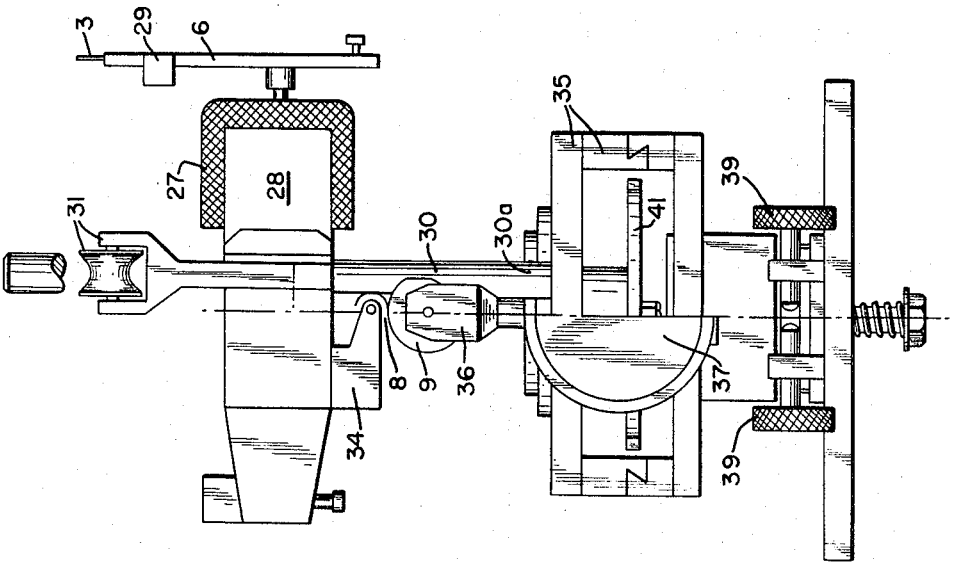
FIG. 3a shows the section.
Figure 3:
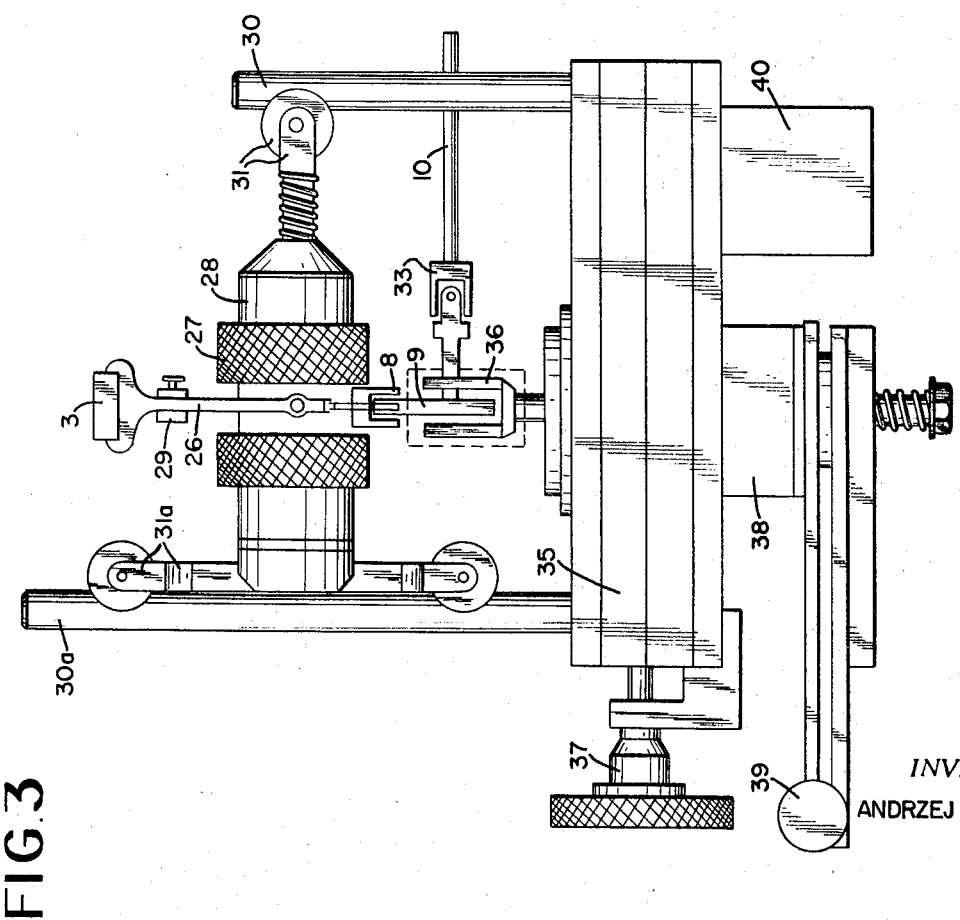
FIG. 3 shows a vibrator in front view.

FIG. 3 and 3a show an example of the vibrator 7 which is an electromagnet consisting of a core 28 and a winding 27. This electromagnet is shifted by means of a carriage 31 and 31a along the guides 30 and 30a. The shifting of the vibrator 7 together with tested sample 3 and arm 6 is performed by means of an arm 34 to which the bearing 8 is secured which moves over the surface of the cam 9 mounted in a lifter 36.

The lifter 36 is moved by means of a servomotor 40 through a gear 41. The cam 9 is coupled to the shaft 10 by means of a clutch 33. Slide 35 and knob 37 serve to move the vibrator 7 in the plane transverse with respect to the light ray P incident on a monocrystal sample 3. Adjustment mechanism 38 along with knob 39 provide for the vibrator rotation in the level plane.

FIG. 4 shows the vibrator with a control stage. The tested sample 3 together with the arm 6 is mounted in a rotor 42 which is placed between poles $N_1$, $N_2$, $S_1$ and $S_2$ of the core 28 of a permanent magnet 43. The anode of a valve $L_1$ is connected, via coils 27a and 27c, wound on the poles $N_2$ and $S_2$, coils 27b and 27d, wound on the poles $N_1$ and $S_1$ and a resistor $R_2$, to the positive terminal of a current source. The anode of a valve $L_2$ is connected to the said positive voltage source via: coils $27d'$, $27b'$ wound on the poles $S_1$, $N_1$, coils $27c'$, $27a'$, wound on the poles $S_2$, $N_2$, and resistor $R_1$.

The device according to the invention operates in the following manner. After placing the monocrystal sample 3 in the arm 6 (FIG. 1) the sample is set in horizontal vibration by energizing the vibrator 7 winding with mains voltage U. The electric motor 15 is energized to drive the shaft 10 and cam 9 with the bearing 8 over the cam surface. The cam 9 drives the vibrator 7 and, in consequence, the tested sample (FIG. 2) into a vertical motion. The horizontal motion of the tested monocrystal sample is synchronized with the horizontal motion of the electron beam W in the tube 20, the beam being deflected by means of the horizontal plates 22 supplied with mains voltage U from the amplifier 18. The voltage U is led by a phase angle by the voltage U used to supply the winding of the vibrator 7. This phase shift between the voltages is indispensable in view of the inertia of the tested sample 3 and the vibrating arm 6. That inertia results in a phase lag of the motion of tested sample with respect to the motion of the electron beam W reproducing the image. To obtain the accordance in horizontal motion of the tested sample 3 and the motion of electron beam W, a phase shifter 16 is included in the supply circuit of the vibrator 7. The shifter provides a phase leading of the voltage U wit respect to the horizontal deflection voltage in the tube 20.

The accordance in vertical motion of the tested sample 3 and the vertical deflection of the electron beam W is obtained by providing on the shaft 10 the following elements: cam 9 lifting the vibrator 7, slider 14 of potentiometer 13, from which slider the vertical deflection plates 21 of the valve 20 are supplied.

The length of the vibrating arm 6 is considerably higher than the horizontal deflection amplitude of the tested sample 3, and therefore the level motion of the light spot over the sample is linear. Since the vertical motion of the sample 3 is much slower than its horizontal motion, the light spot of the incident light ray P performs a scanning pattern, point-by-point over selected area of the sample over a selected area of the sample 3, this pattern being similar to the line scanning which is performed by the electron beam over the caesium mosaic in transmitting image tubes.

The light ray P coming from the source 1 passes the optical system 2, tested sample 3, optical system 4, and is always projected on one selected point of the photoelectric point-detector 5.

The ray P, while penetrating the sample 3, is modulated according to the differences in light absorption in the individual areas of the sample. Thus, the electric pulses of the dissected absorption-image of the examined crystal sample are obtained from the detector 5. These electric pulses are amplified by the amplifier 26 and fed via the contact $a$ of switch 24 to the grid 23 of the picture tube 20 which, in consequence, provides the image of the intrinsic structure of the tested sample on its screen. Should the switch 24 be turned over to position $b$, a photoelectric image of the tested sample will be displayed on the screen, since under these conditions, the grid 23 of the tube 20 will now be controlled by the photoelectric voltage sampled by the fixing electrodes $E_1$ and $E_2$ and amplified by the amplifier 25. The switch 24 therefore provides the facility of superposition of absorption and photoelectric images in order to correlate these images for the samples which feature the both effects.

The picture tube 20 is provided with a persistence screen to match the slow horizontal motion of the electron beam W (single frame duration is approximately 6 seconds). When a frame tracing is completed, a negative blanking pulse is fed to the grid 23 of the tube 20 to blank out the beam W tracing the frame. This blanking pulse is fed via contact 12 actuated by another cam 11 when the frame is completed.

FIG. 4 provides further explanation of the operation of electromagnet 7. The control grids of the valves $L_1$ and $L_2$ are fed by a sinusoidal voltage U. When the valve $L_1$ is conducting (positive half-wave of the sinusoid) the rotor 42 deflects towards $c$ and then returns to its initial position. When the valve $L_2$ is conducting, the rotor deflects towards $d$ and then returns to the initial position.

Thus, during one period, the arm deflects from its initial point to the point $c$, then passes the initial point over to the point $d$ and back to the initial point.

There are also possible, of course, other arrangements making use of the principles of the invention, both regarding the synchronization systems of image registration and the driving of the tested semiconductor sample. For example, the motion of the arm 6 can be used to generate, by optical or induction means, pulses for controlling a generator horizontal deflection voltage in the picture tube.

I claim:
1. A device for detecting crystallographic defects in materials, especially in semiconductor monocrystals, which device comprises a stationary light source, an optical system a detector, a sample semiconductor to be tested, means supporting said sample between said light source and the said detector for movement with respect to a stationary light ray produced by said source, the latter means comprising a rotary shaft, a vibrator cam mounted on said shaft, a vibrator supported on said cam and including an arm on which said sample is mounted, a picture tube with a control grid and horizontal and vertical plates, a potentiometer with a slider connected to said shaft and to the vertical plates of a picture tube, a filtered supply source, an amplifier of time base voltage connecting the output of the filtered supply source to said horizontal plates of the picture tube, and a phase shifter connecting the output of the filtered supply source to the vibrator.

2. A device according to claim 1, wherein said vibrator comprises an electromagnet including four symmetrically arranged poles with windings wound thereon, and a rotor movable between said poles, said arm being mounted on said rotor.

3. A device according to claim 2, comprising electronic valves for driving the windings of said electromagnet.

4. A device according to claim 1, comprising a contact cam mounted on said rotary shaft, and a contact operated by said contact cam to apply a blanking pulse to said grid.

5. A device according to claim 4, wherein said contact periodically supplies a negative voltage to the control grid.

6. A device according to claim 1, comprising a second amplifier, a detector connected to said control grid via said second amplifier and a changeover switch between the amplifier and the control grid to control the latter.

7. A device according to claim 6, comprising electrodes on said arm securing said monocrystal sample and connected by said time base voltage amplifier to another contact of the changeover switch which controls the grid of said picture tube.

8. A device according to claim 1, comprising a source of voltage for said vibrator having a phase leading with respect to the phase of voltage fed to the horizontal plates of the said picture tube.